Dec. 19 1922. 1,439,240
R. HOFFMANN.
METHOD OF ELASTIC FIXING OF THE ARMATURES OF ELECTRIC MOTORS UPON THE DRIVING AXLES OF LOCOMOTIVES.
FILED DEC. 2, 1921.
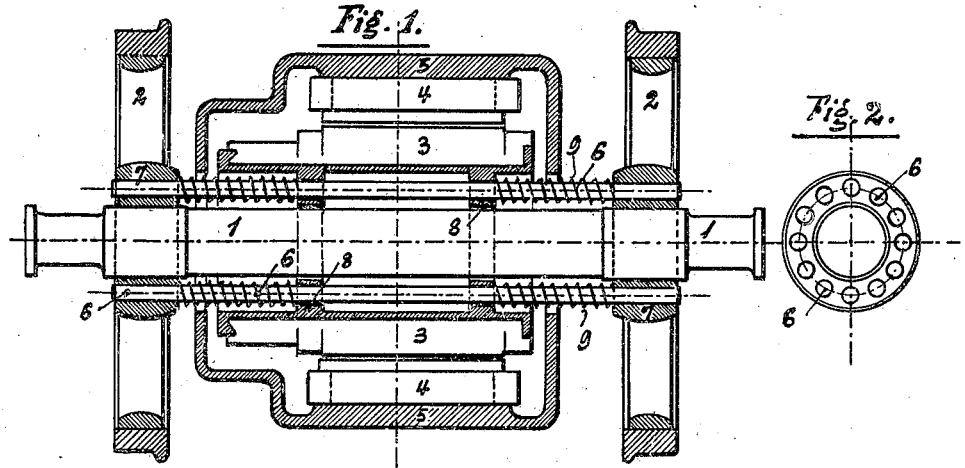
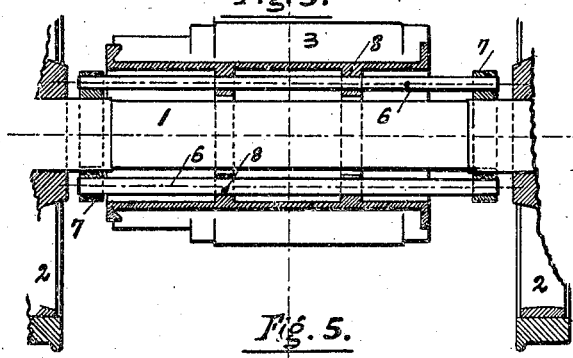
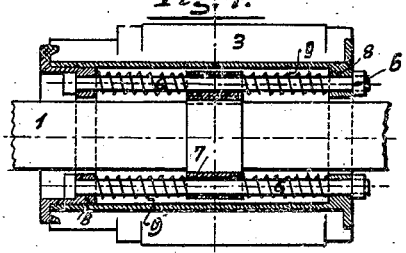
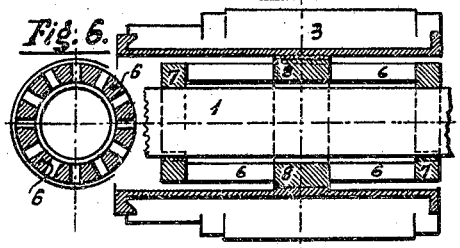
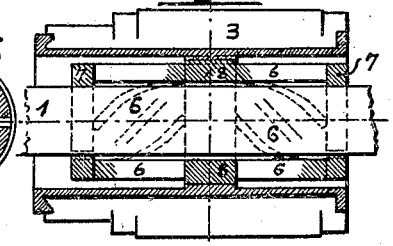
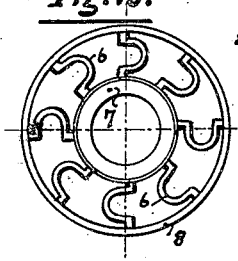
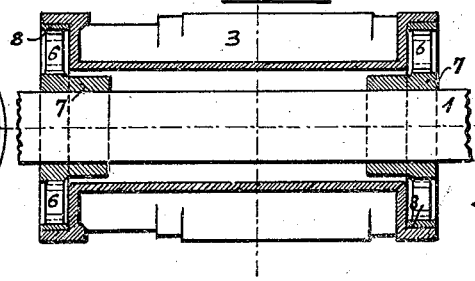
Inventor:
Rudolf Hoffmann.

Patented Dec. 19, 1922.

1,439,240

UNITED STATES PATENT OFFICE.

RUDOLF HOFFMANN, OF ROMANSHORN, SWITZERLAND.

METHOD OF ELASTIC FIXING OF THE ARMATURES OF ELECTRIC MOTORS UPON THE DRIVING AXLES OF LOCOMOTIVES.

Application filed December 2, 1921. Serial No. 519,430.

*To all whom it may concern:*

Be it known that I, RUDOLF HOFFMANN, a citizen of the Republic of Switzerland, residing at Romanshorn, Switzerland, have invented a new and useful Method of Elastic Fixing of the Armatures of Electric Motors Upon the Driving Axles of Locomotives, of which the following is a specification.

This invention relates to electric motors driving locomotives and especially to such motors, that are seated directly around the shafts of the driving axles. The object of the invention is to provide means for preventing the vibrations of the moving wheels and axles from being communicated to the rotating armature of the motor and thereby prolonging the life of the motor armature and driving axle.

Locomotives with direct driving electric motors having the heavy armature or rotating part of the motor rigidly fixed on the shaft of the driving axle, have the disadvantage, that the vibrations due to the roughness of the rail surface and to the gaps at the rail joints will enormously strain the rails and wheels and armature, the shocks produced being proportionate to the joint mass of these parts, and as these masses are so great the axle shaft has to be made very stiff in order that the armature should not work loose upon it.

It would therefore be of very great advantage to the saving of the rails and wheels and axles, and especially also to the armature itself, if this latter could be supported elastically upon the axle shaft, in order to reduce to a possible minimum all shocks and vibrations produced by the running on the road.

It is the object of the present invention to show simple and effective means for obtaining this result, viz: elastic fixing of the armature on the driving axle.

This fixing or supporting should be such, that the flexibility is the same in all radial directions, and equal at both ends of the armature. Further, the springs or elastic parts should if possible not have any motion or loose working surface on either the axle or the armature. Several forms of elastic hubs for armatures have been proposed, but none, so far as is known, have answered the requirements above noted.

It has been proposed to put a solid sleeve or tube over the axle with some play between the two, the sleeve being however fixed at one of its ends to the axle shaft and bearing at its other end on the armature. But such a sleeve if strong enough to prevent breaking, is of necessity more rigid, or much less flexible, than the axle itself.

The flexible fixing, which I now propose is shown on the adjoined drawing, in which Figures 1, 3 and 4 are longitudinal sections through the armature and its elastic fixing, showing three different ways of fixing elastic bars, which are arranged around the axle inside the armature, and which support the armature by their bending strength. Figure 2 is a cross section through the armature shaft and supports shown in Figs. 1, 3 and 4. Fig. 5 is a longitudinal vertical section of a modified form of armature support. Fig. 6 is a cross section of the support shown in Fig. 5. Figures 7 and 8, and 9 and 10 are longitudinal and cross sections respectively of bundles of elastic bars, that are bent in a helical form around the shaft in the former, and in a semicircular form in the latter case, and which also form a unitary structure together with their fixing rings.

In all these figures 1 is the driving axle shaft; 2—2 are the driving wheels; 3 is the armature or rotating part of the electric motor; 4—4 are the pole pieces and 5 the housing or non-rotating part of the motor; 6—6 are the elastic bars; 7—7 are rings to hold these bars together and fix them to the axle shaft 1; 8—8 are rings on the inside of the armature, to hold the bars against it. The rings 7—7 have to be keyed or otherwise fixed to the shaft, and the rings 8—8 must be solidly fixed to the armature, in order that the turning or rotating movement of the electric current acting on the armature be transmitted on to the axle-shaft and drive the wheels 9—9 are springs for centering the armature.

In Figure 1 the fixing rings 7—7 are identical with the bosses or hubs of the driving wheels. The straight elastic bars 6—6 pass through them from end to end and bear in the rings 8—8 in the armature 3. These bars 6—6 are preferably made of hardened steel, and their flexibility should be such, that the so-called critical number of revolutions of the armature, in considering its mass and the possible one-sided attraction or magnetic pull of the polepieces be much above the maximal number of revolutions of the driving wheels. By varying the diameter of the bars and the number of bars and altering the distance between the rings 7—7 and 8—8 the flexibility can be varied to a great extent. A range of flexibility of about $\frac{1}{16}$ or $\frac{1}{8}$ of an inch should in ordinary circumstances be sufficient to do away with all the small but very rapid and constantly occurring vibrations.

The arrangement of elastic bars as shown in Fig. 1 has the advantage, that the bars can individually be exchanged without removing any one of the wheels from the axle.

In the Figure 3 an arrangement is shown with rings 7—7 independent of the wheel hubs, in order not to perforate the latter.

In Figure 4 the order of fixing rings is reversed; namely one or two rings 7—7 are fixed near the middle of the axle, and the holding rings 8—8 of the armature are outside of the rings 7—7.

The armature is here shown as constructed of two telescoping sections each having an internal flange or ring 8, formed thereon. The elastic rods 6 are made in the form of long bolts which are passed through the rings 8—8 and through a central ring 7 on the shaft 1, said rods being provided with heads and nuts so that they connect to two sections of the armature together. Coil springs 9 surround the rods 6 and are interposed between the rings 7 and the two outer rings 8—8. These rings form abutments for the ends of the springs and as the bars 6 are slidable in the ring 7, said springs operate to yieldingly hold the armature against axial movement due to side thrusts when curves in the road are encountered.

In Figs. 5 and 6, the elastic bars 6 are formed integral with the rings 7 fixed on the shaft and the ring 8 fixed to the armature. This one piece structure may be made in any suitable manner.

Instead of making the elastic bars straight as previously described, they may be made helical as shown in Figs. 7 and 8.

The axle and armature may be elastically connected together by springs 6 having the form shown in Figs. 9 and 10. These springs are substantially U-shaped and are interposed between the rings 7, fixed on the shaft 1 near both ends of the armature and the rings 8 fixed in the ends of the armature which are recessed to receive the latter rings.

The housing of the field pole pieces or stator may be supported in any known way, either hung on the spring-borne car body, or fixed on a slightly elastic frame, that is carried directly by the axle boxes, short springs being interposed between this frame and the stator.

I claim:

1. In an electric vehicle, the combination with the vehicle axle, and driving wheels fixed thereon, of flexible supporting members connected with the axle, an armature surrounding the axle and supporting members, and means connecting the armature to said members adapted to permit a limited axial movement of the armature relative to the axle.

2. In an electric vehicle, the combination with the vehicle axle and driving wheels fixed thereon, of an armature sleeve surrounding the axle and spaced therefrom, yielding supporting members interposed between the axle and sleeve, means connecting the supporting members to the axle, and means connecting the sleeve to the supporting members adapted to permit a limited axial movement of the sleeve relative to the axle.

3. In an electric vehicle, the combination with the vehicle axle, and driving wheels fixed thereon, of an armature surrounding the axle and spaced therefrom, rings fixed on the axle and armature, and flexible supporting members interposed between the axle and armature and so connected with the rings as to permit a limited axial movement of the armature relative to the axle.

4. In an electric vehicle, the combination with the vehicle axle, and driving wheels fixed thereon, of an armature surrounding the axle, a ring fixed on the latter, rings fixed inside the armature, and a plurality of flexible supporting rods slidably mounted in the ring on the axle and connected to the rings in the armature.

5. In an electric vehicle, the combination with the vehicle axle, and driving wheels fixed thereon, of an armature surrounding the axle, a ring fixed on the latter, rings fixed inside the armature, and a plurality of flexible supporting rods slidably mounted in the ring on the axle and fixed in the rings in the armature.

6. In an electric vehicle, the combination with the vehicle axle and driving wheels fixed thereon, of an armature sleeve comprising two telescoping cylindrical members surrounding the axle, rings fixed on the inside of each member, flexible rods passing through said rings and connecting the cylindrical members together, and a ring fixed on the axle forming a bearing for the rods.

7. In an electric vehicle, the combination with the vehicle axle, and driving wheels fixed thereon, of an armature sleeve comprising two telescoping cylindrical members surrounding the axle, rings fixed on the inside of each member, flexible rods passing through said rings and connecting the cylindrical members together, a ring fixed on the axle forming a bearing for the rods, and spiral springs surrounding the latter between the rings.

In testimony that I claim the foregoing as my invention, I have signed my name.

RUDOLF HOFFMANN.